United States Patent Office 3,445,220
Patented May 20, 1969

3,445,220
METHOD OF MAKING HUMUS BY AERATING A MIXTURE OF CACHAZA AND PROTEIN
Gerald A. Anderson, Nags Head, N.C. (2845th USAF Hospital or 3219 Orion Circle, Griffiss AFB, New York 13440)
No Drawing. Filed Mar. 8, 1967, Ser. No. 621,461
Int. Cl. C05f 11/08, 5/00
U.S. Cl. 71—9                                            8 Claims

ABSTRACT OF THE DISCLOSURE

A soil improver is made from cachaza, a waste product of sugar cane processing. According to the invention, cachaza is converted into a sweet-smelling humus soil improver by aerating a mixture of cachaza and a protein. This process causes the production of an excellent humus by a process of exothermic aerobic fermentation without adding fermentation yeasts. The product is moist and fluffy and much like sweet smelling soil and has been found to be an excellent soil improver, and particularly advantageous where the soil is poor in humus.

---

The present invention relates to a soil improver and to a method of making same. More particularly, the invention relates to a soil improver made from cachaza, a waste product of sugar cane processing, and protein from inexpensive sources such as fish solubles, fish meal, packing house tankage, and the like.

Humus is essentially organic mater present in soils. It is derived from plant residues such as grass clippings, leaves and the like. The amount of humus in soil varies widely and its presence is beneficial to plant growth. Soils rich in humus hold moisture better, drain well and keep the soil porous to permit penetration of moisture, air and nutrients all of which factors promote plant growth. In order to improve soils poor in humus, such as soils rich in clay or sand, vast quantities of humus are required which may result in great expense.

It is an object of the present invention to provide an inexpensive soil improver. It is a further object of the invention to provide a use for a waste product of a cane sugar processing plant. It is a further object to provide a simple method of making an inexpensive humus soil improver in simple equipment requiring minimum upkeep and operating expense.

These and other objects which will become apparent in view of the following detailed description of the invention are achieved by aerating a mixture of cachaza and a protein to cause an exothermic fermentation reaction the product of which has the appearance of sweet-smelling humus-rich dirt and which can be added directly to soil to improve same.

Cachaza (or cachasse, filter mud, or scum) is obtained as a waste product in the processing of sugar cane. In a sugar cane processing plant, cane is shreadded and the juice removed by running the shredded cane through roller mills. About 95% of the juice is thus removed and the spent cane, called bagasse, is either burned as plant fuel or used to manufacture insulating material.

The junce contains the sugar and, in addition, contains a large percentage of impurities in the form of plant residue and some soil. This material must be removed from the juice before the sugar can be extracted. To do this, the raw juice is treated with slaked lime or CaO which causes a floc to form. This floc consists of the CaO plus the impurities which adhere to it. This material is allowed to settle to the bottom of a continuous settler tank where it is removed in a continuous process. This precipitate contains a sizeable amount of sugar which is recovered in the following manner. Water is added to dissolve the sugar and the aqueous mixture is then turned into a shallow tank. Suspended over and partially submerged in the mixture is a revolving horizontal drum vacuum filter. It is covered on the outside by a fine wire mesh. A vacuum is drawn in the drum, and as it revolves, the sugar solution is pulled through the mesh, leaving the residue on the surface of the drum. Prior to the floc and water mixture being put into the tank, a small amount of finely chopped bagasse is added in order to form a matrix on the wire mesh to assist in more effective filtration. The material which is accumulated on the ouside of the drum is cachaza. It is a solid muddy substance which contains plant residue, CaO, and fibers of bagasse. It also contains less than 3% sugar, an amount which it is economically infeasible to remove. Analysis of typical samples reveals protein content of 0.49%; nitrogen 2.2%; phosphate 2.8% and; potash 0.4%.

While the precise processing techniques and equipment yielding cachaza will vary from plant to plant, the material is a well known waste product in the industry characterized in having trace amounts of sugar not feasible to recover and produced in large quantity as a consequence of the clarification of sugar cane juice. The material has essentially no feasible uses and is thus a waste product. It is known to mix cachaza with water for use as a manure, but it has been discovered that any extensive use of the material, such as would be required to increase the humus content of a clay-rich soil, will cause damage to grass and other plants. The term "cachaza," as used in the present specification and claims, shall mean this waste product of sugar cane processing.

According to the present invention, the cachaza is converted to an organic humus soil improver which is beneficial to plants when used in any quantity desired to improve soil. To convert the cachaza to humus, it is aerated with protein, such as by agitation in the presence of air or other oxygen containing gas. The oxygen is most conveniently utilized in the form of atmospheric air. This causes an exothermic fermentation process which yields a sweet-smelling dirt-like humus soil improver. Any protein will be adequate to support the fermentation process. However, soluble or globular proteins are preferred, since in solution, they can be intimately admixed with the cachaza.

Proteins are generally macromolecular compounds made up of a variety of $\alpha$-amino acids joined by polypeptide linkages through the $\alpha$-amino and $\alpha$-carboxyl groups. In some cases, the macromolecule is a simple protein consisting essentially of amino acids, and in other cases it is a conjugated protein containing a nonprotein moiety as an integral part of the molecule. Proteins are thus polypeptides. The term protein is usually reserved for higher molecular weight polypeptides and, as used herein, the term protein is meant to include the higher polypeptides having molecular weights of at least 2000.

Proteins are generally globular or fibrous. Globular proteins are soluble in ordinary aqueous solvents and are preferred for that reason. Water soluble globular proteins such as albumins, histones and protamines are particularly suitable. Proteins are widely available in animal tissue including tendons, muscle, skin and cartilage. They may also be derived from vegetable sources, e.g., soybeans, cottonseed, peanuts, etc. In accordance with the invention, the protein is conveniently utilized in crude form and is not required to be purified. For example, a suitable form of protein is available as "fish solubles." This product is a concentrated liquid extracted from fish. Fish is ground, compressed and dried to form fish meal which is a constituent of animal feed. The juice extracted is called fish solubles when concentrated. The juice is usually concentrated by evaporation to an aqueous solution containing about 50% solids. A good portion of the solids, usually about 60%, is protein. This "concentrated fish solubles" solution is known as such and used as a constituent for animal feeds and the like. It is inexpensive and available in large quantity. Relatively small quantities of the material can be mixed directly with cachaza and aerated according to the invention to produce the soil improver product. Dried fish solubles and fish meal may also be used.

The invention will now be illustrated in several examples. While the protein mentioned in the examples is derived from fish, it is to be understood that other proteins can be similarly utilized.

EXAMPLES 1–20

Twenty 55 gallon drums were filled with a mixture of cachaza and protein as follows:

| Drum No. | Proteins (lbs. per 100 lbs. cachaza) | |
|---|---|---|
| | Concentrated fish solubles | Fish meal |
| 1 | ½ | 4 |
| 2 | 1 | 4 |
| 3 | 1½ | 4 |
| 4 | 2 | 4 |
| 5 | ⅔ | 4 |
| 6 | 1⅓ | 4 |
| 7 | 2 | 4 |
| 8 | 2⅔ | 4 |
| 9 | 1 | 4 |
| 10 | 2 | 4 |
| 11 | 3 | 4 |
| 12 | 4 | 4 |
| 13 | 1½ | 4 |
| 14 | 2⅔ | 4 |
| 15 | 4 | 4 |
| 16 | 5½ | 4 |
| 17 | 2½ | 5 |
| 18 | 2½ | 10 |
| 19 | 2½ | |
| 20 | | 5 |

A reaction commenced in each barrel causing gas bubbles but not much heat. After about 24 hours, the process had slowed down. Except for the upper 3 inches in each barrel, the contents of all the barrels had a silage-like odor and the pH was below 6.0.

A small amount of the material, which had turned black, was removed from the top of barrel No. 6 and laid on the ground to dry and was found to have a pH of 7.0 after one more day as compared with the value of 5.0 for the material not removed from barrel No. 6.

After one more day, it was observed that the material at the top of all the barrels was black and relatively dry whereas that in the lower part of the barrels was brown and wet. A test showed that the black material was not acidic whereas the brown material was.

Five days after the start of the test, barrel No. 10 was completely dumped in a pile on the ground. The brown material started immediately to turn black at the surface of the pile. One day later, the exposed surface portion tested neutral on pH paper. At that time, barrels 20, 9, 8 and 7 were completely dumped on the ground and all started to turn black immediately. The sixth day, the No. 10 pile was found to be at a temperature of from 120 to 138° F. Barrels No. 5 and 6 were then dumped and reacted as the others. On the next day, all of the remaining barrels (1–5 and 11–19) were dumped. All piles were turned daily by pitchfork. It was observed that the No. 10 reaction was complete on the tenth day. A total of 10 days had elapsed during which the material was in the drum for 5 days and on the ground for 5 days, and daily turned with a pitchfork. The material smelled like good, sweet earth and had no ammonia or urea smell. The reactions in the other piles proceded in the same way.

After all of the reactions seemed completed, the contents of barrels 1 through 10 were spread on 10 ft. by 25 ft. aerated grass plots set out on a golf course and then watered for two hours. The soil is clay-rich and has poor water retention properties. On the next day, each plot was again watered for two hours. On the next day, plots 1–10 showed increased greening (relative to adjacent aerated and watered control-plots) and some new growth. Plots 1–10 were watered for four hours and the contents of barrels 11–20 spread out on individual plots and watered for four hours. On the next day, increased greening and new growth were quite prevalent in plots 1–10. Two days later, all plots showed rapid green grass growth.

EXAMPLE 21

From the results of the foregoing examples, it became apparent that the reaction involved an exothermic aerobic fermentation and that the humus like product could be obtained by aerating a mixture of the cachaza and protein. This was next done in large scale and readily produced a high quality humus product. Thirty six hundred pounds of cachaza, a solution of 45 lbs. of concentrated fish solubles in 50 gallons of water, and about 35 lbs. of fish meal were dumped into a shallow concrete vessel forming a bed about nine inches deep. The bed of material was soaked with water and turned periodically by shovel over a one month period. A similar amount of cachaza without protein was provided in a bed nine inches deep and left untouched. After about a month, during which the piles were soaked by two rain showers, the reaction in the protein-treated pile was complete. One half of the treated batch was applied to an aerated circular grass area on a golf course. In three days, the area was noticeably very much greener. The other half of the batch was stored for about two weeks and then spread on a golf green and the results were excellent. The protein-free control-bed of cachaza had turned to white ash devoid of humus and could not be effectively used as a soil improver.

In the foregoing examples, the cachaza contained about 70% moisture. The concentrated fish solubles contained about 50% solids of which about 60% was protein and the fish meal was about 50% protein. It will be seen that very little protein is required but that larger amounts are not harmful. In general, as little as 2% or 1% or less protein by weight based on the solids content of cachaza is suitable. As much protein above this amount as is desired can be added and the maximum is dictated more by economics and aesthetics than operability. Generally speaking, up to 5% or 10% by weight of protein based on the solids content of the cachaza is sufficient but larger amounts can be used.

The aeration of the mixture is enhanced by contacting a large surface area of the mixture with oxygen. Air or other oxygen-containing gases may be used and the term "aeration" as used in the specification and claims is used to include such oxygen-containing gases and not just atmospheric air. Surface contact is enhanced by creating large surfaces of the mixture, by agitation to expose fresh surfaces to aeration, by introducing oxygen containing gas into the mixture, or by combinations of these techniques. The process may be performed by simply turning piles of the mixture on the ground with a pitchfork or performed in fully automated and continuously operated equipment such as used in the bio-oxidation of sewerage materials.

While the protein-treated cachaza according to the invention can be used directly as a soil improver, it can be enriched with fertilizer or additional humus material. The material has some nitrates, phosphates and potash and thus has some fertilizer value which can be enhanced by the addition of additional fertilizing material.

What is claimed is:

1. A method of making a soil improver which comprises the steps of aerating a water-containing mixture of cachaza and protein to induce an exothermic fermentation reaction and continuing said aeration until said exothermic fermentation reaction is at least substantially complete to form an organic humus soil improver.

2. A method according to claim 1 wherein at least 1% by weight of said protein is mixed with said cachaza based on the weight of the solids content of said cachaza.

3. A method according to claim 1 wherein from about 1% to 10% by weight of a globular protein is mixed with said cachaza based on the weight of the solids content of said cachaza.

4. A method of making a soil improver comprising the steps of mixing an aqueous suspension of a globular protein with cachaza, aerating said mixture in a shallow vessel to effect an aerobic exothermic fermentation reaction, and continuing said aeration until said exothermic reaction is at least substantially complete to form an organic humus soil improver.

5. A method according to claim 4 wherein said aqueous suspension is added in an amount sufficient to provide at least 2% by weight of protein based on the weight of the solids content of said cachaza.

6. A method according to claim 4 wherein said globular protein comprises animal protein.

7. A method according to claim 4 wherein said globular protein comprises fish protein.

8. A method according to claim 4 wherein said aeration is induced by agitating said mixture in the presence of atmospheric air.

References Cited

UNITED STATES PATENTS

| | | |
|---|---|---|
| 1,619,679 | 3/1927 | Richards et al. |
| 2,613,147 | 10/1952 | Owen et al. |
| 3,000,789 | 9/1961 | Bertullo et al. |

DONALL H. SYLVESTER, *Primary Examiner.*

R. D. BAJEFSKY, *Assistant Examiner.*

U.S. Cl. X.R.

71—15, 16, 26